United States Patent
Amitay et al.

(10) Patent No.: US 10,964,082 B2
(45) Date of Patent: Mar. 30, 2021

(54) AVATAR BASED ON WEATHER

(71) Applicant: Snap Inc., Santa Monica, CA (US)

(72) Inventors: Daniel Amitay, New York City, NY (US); Matthew Colin Grantham, Toronto (CA); David Whyte, Toronto (CA)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/286,532

(22) Filed: Feb. 26, 2019

(65) Prior Publication Data

US 2020/0273230 A1 Aug. 27, 2020

(51) Int. Cl.
*G06T 13/60* (2011.01)
*G01W 1/06* (2006.01)
*G06T 13/40* (2011.01)
*G06F 3/0483* (2013.01)

(52) U.S. Cl.
CPC .............. *G06T 13/40* (2013.01); *G01W 1/06* (2013.01); *G06T 13/60* (2013.01); *G01W 2203/00* (2013.01); *G06F 3/0483* (2013.01)

(58) Field of Classification Search
None
See application file for complete search history.

(56) References Cited

U.S. PATENT DOCUMENTS

| | | | |
|---|---|---|---|
| 3,839,327 A | 10/1974 | Yao | |
| 5,880,731 A | 3/1999 | Liles et al. | |
| 6,023,270 A | 2/2000 | Brush et al. | |
| 6,223,165 B1 | 4/2001 | Lauffer | |
| 6,520,861 B2 * | 2/2003 | Shoji | A63F 13/10 472/65 |
| 6,772,195 B1 | 8/2004 | Hatlelid et al. | |
| 6,842,779 B1 | 1/2005 | Nishizavzra Yasuo | |
| 7,342,587 B2 | 3/2008 | Danzig et al. | |
| 7,468,729 B1 | 12/2008 | Levinson | |

(Continued)

FOREIGN PATENT DOCUMENTS

| | | |
|---|---|---|
| CN | 109863532 A | 6/2019 |
| CN | 110168478 A | 8/2019 |

(Continued)

OTHER PUBLICATIONS

"International Application Serial No. PCT/US2020/019912, International Search Report dated Jun. 29, 2020", 3 pgs.

(Continued)

*Primary Examiner* — James A Thompson
(74) *Attorney, Agent, or Firm* — Schwegman Lundberg & Woessner, P.A.

(57) ABSTRACT

Aspects of the present disclosure involve a system comprising a computer-readable storage medium storing a program and a method for generating an avatar based on a weather condition. The program and method include determining a current location of a user device; retrieving a weather condition at the current location of the user device; automatically generating a weather-based avatar for a person associated with the user device, the weather-based avatar having a visual attribute corresponding to the weather condition; and, in response to a request from a requesting device, causing display on the requesting device of the weather-based avatar.

20 Claims, 11 Drawing Sheets

(56) References Cited

U.S. PATENT DOCUMENTS

| | | | |
|---|---|---|---|
| 7,636,755 B2 | 12/2009 | Blattner et al. | |
| 7,639,251 B2 | 12/2009 | Gu et al. | |
| 7,775,885 B2 | 8/2010 | Van Luchene et al. | |
| 7,818,392 B1* | 10/2010 | Martino | G06Q 10/10 709/217 |
| 7,859,551 B2 | 12/2010 | Bulman et al. | |
| 7,885,931 B2 | 2/2011 | Seo et al. | |
| 7,908,554 B1* | 3/2011 | Blattner | G06Q 10/107 715/706 |
| 7,925,703 B2 | 4/2011 | Dinan et al. | |
| 8,088,044 B2 | 1/2012 | Tchao et al. | |
| 8,095,878 B2 | 1/2012 | Bates et al. | |
| 8,108,774 B2 | 1/2012 | Finn et al. | |
| 8,117,281 B2 | 2/2012 | Robinson et al. | |
| 8,130,219 B2 | 3/2012 | Fleury et al. | |
| 8,146,005 B2 | 3/2012 | Jones | |
| 8,151,191 B2 | 4/2012 | Nicol | |
| 8,384,719 B2 | 2/2013 | Reville et al. | |
| RE44,054 E | 3/2013 | Kim | |
| 8,396,708 B2 | 3/2013 | Park et al. | |
| 8,425,322 B2 | 4/2013 | Giiio | |
| 8,458,601 B2 | 6/2013 | Castelli et al. | |
| 8,462,198 B2 | 6/2013 | Lin et al. | |
| 8,484,158 B2 | 7/2013 | Deluca et al. | |
| 8,495,503 B2 | 7/2013 | Brown et al. | |
| 8,495,505 B2 | 7/2013 | Smith et al. | |
| 8,504,926 B2 | 8/2013 | Wolf | |
| 8,559,980 B2 | 10/2013 | Pujol | |
| 8,564,621 B2 | 10/2013 | Branson et al. | |
| 8,564,710 B2 | 10/2013 | Nonaka | |
| 8,581,911 B2 | 11/2013 | Becker et al. | |
| 8,597,121 B2 | 12/2013 | del Valle | |
| 8,601,015 B1 | 12/2013 | Wang Hui | |
| 8,601,379 B2 | 12/2013 | Marks et al. | |
| 8,632,408 B2 | 1/2014 | Gillo | |
| 8,648,865 B2 | 2/2014 | Dawson et al. | |
| 8,659,548 B2 | 2/2014 | Hildreth | |
| 8,683,354 B2 | 3/2014 | Khandelwal et al. | |
| 8,692,830 B2 | 4/2014 | Nelson et al. | |
| 8,810,513 B2 | 8/2014 | Ptucha et al. | |
| 8,812,171 B2 | 8/2014 | Filev et al. | |
| 8,832,201 B2 | 9/2014 | Wall | |
| 8,832,552 B2 | 9/2014 | Arrasvuori et al. | |
| 8,890,926 B2 | 11/2014 | Tandon et al. | |
| 8,892,999 B2 | 11/2014 | Nims et al. | |
| 8,924,250 B2 | 12/2014 | Bates et al. | |
| 8,963,926 B2 | 2/2015 | Brown et al. | |
| 8,989,786 B2 | 3/2015 | Feghali | |
| 9,086,776 B2 | 7/2015 | Ye et al. | |
| 9,105,014 B2 | 8/2015 | Collet et al. | |
| 9,241,184 B2 | 1/2016 | Weerashigheilal, Sr. | |
| 9,256,860 B2 | 2/2016 | Herger et al. | |
| 9,298,257 B2 | 3/2016 | Hwang et al. | |
| 9,314,692 B2 | 4/2016 | Konoplev et al. | |
| 9,330,483 B2 | 5/2016 | Du et al. | |
| 9,357,174 B2 | 5/2016 | Li et al. | |
| 9,361,510 B2 | 6/2016 | Yao et al. | |
| 9,378,576 B2 | 6/2016 | Bouaziz | |
| 9,402,057 B2 | 7/2016 | Kaytaz | |
| 9,412,192 B2 | 8/2016 | Mandel | |
| 9,460,541 B2 | 10/2016 | Li et al. | |
| 9,489,760 B2 | 11/2016 | Li et al. | |
| 9,503,845 B2 | 11/2016 | Vincent | |
| 9,508,197 B2 | 11/2016 | Quinn | |
| 9,544,257 B2 | 1/2017 | Ogundokun | |
| 9,576,400 B2 | 2/2017 | Van Os et al. | |
| 9,589,357 B2 | 3/2017 | Li et al. | |
| 9,592,449 B2 | 3/2017 | Barbalet et al. | |
| 9,648,376 B2 | 5/2017 | Chang et al. | |
| 9,652,888 B1* | 5/2017 | Johnson | G06T 17/05 |
| 9,697,635 B2 | 7/2017 | Quinn | |
| 9,706,040 B2 | 7/2017 | Kadirvel et al. | |
| 9,744,466 B2 | 8/2017 | Fujioka | |
| 9,746,990 B2 | 8/2017 | Anderson et al. | |
| 9,749,270 B2 | 8/2017 | Collet | |
| 9,792,714 B2 | 10/2017 | Li et al. | |
| 9,839,844 B2 | 12/2017 | Dunstan et al. | |
| 9,883,838 B2 | 2/2018 | Kaleal | |
| 9,898,849 B2 | 2/2018 | Du et al. | |
| 9,911,073 B1 | 3/2018 | Spiegel et al. | |
| 9,936,165 B2 | 4/2018 | Li et al. | |
| 9,959,037 B2 | 5/2018 | Chaudhri et al. | |
| 9,980,100 B1 | 5/2018 | Charlton et al. | |
| 9,990,373 B2 | 6/2018 | Fortkort | |
| 10,039,988 B2 | 8/2018 | Lobb et al. | |
| 10,097,492 B2 | 10/2018 | Tsuda et al. | |
| 10,116,598 B2 | 10/2018 | Tucker et al. | |
| 10,155,168 B2 | 12/2018 | Blackstock et al. | |
| 10,242,477 B1 | 3/2019 | Charlton et al. | |
| 10,242,503 B2 | 3/2019 | McPhee et al. | |
| 10,262,250 B1 | 4/2019 | Spiegel et al. | |
| 10,362,219 B2 | 7/2019 | Wilson et al. | |
| 10,475,225 B2 | 11/2019 | Park et al. | |
| 10,504,266 B2 | 12/2019 | Blattner et al. | |
| 10,535,180 B2* | 1/2020 | Dai | G08G 1/096775 |
| 10,573,048 B2 | 2/2020 | Ni et al. | |
| 10,657,701 B2 | 5/2020 | Osman et al. | |
| 2002/0067362 A1 | 6/2002 | Agostino Nocera | |
| 2002/0091005 A1* | 7/2002 | Shoji | A63F 13/57 472/65 |
| 2002/0169644 A1 | 11/2002 | Greene | |
| 2005/0162419 A1 | 7/2005 | Kim et al. | |
| 2005/0206610 A1 | 9/2005 | Cordelli | |
| 2006/0294465 A1 | 12/2006 | Ronen et al. | |
| 2007/0113181 A1 | 5/2007 | Blattner et al. | |
| 2007/0168863 A1 | 7/2007 | Blattner et al. | |
| 2007/0176921 A1 | 8/2007 | Iwasaki et al. | |
| 2008/0158222 A1 | 7/2008 | Li et al. | |
| 2008/0201638 A1 | 8/2008 | Nair | |
| 2008/0207183 A1* | 8/2008 | Root | H04M 3/42348 455/414.2 |
| 2009/0016617 A1 | 1/2009 | Bregman-Amitai et al. | |
| 2009/0055484 A1 | 2/2009 | Vuong et al. | |
| 2009/0070688 A1 | 3/2009 | Gyorfi et al. | |
| 2009/0098911 A1 | 4/2009 | Kim et al. | |
| 2009/0099925 A1 | 4/2009 | Mehta et al. | |
| 2009/0106672 A1 | 4/2009 | Burstrom | |
| 2009/0158170 A1 | 6/2009 | Narayanan et al. | |
| 2009/0177976 A1 | 7/2009 | Bokor et al. | |
| 2009/0202114 A1 | 8/2009 | Morin et al. | |
| 2009/0265604 A1 | 10/2009 | Howard et al. | |
| 2009/0300525 A1 | 12/2009 | Jolliff et al. | |
| 2009/0303984 A1 | 12/2009 | Clark et al. | |
| 2010/0011422 A1 | 1/2010 | Mason et al. | |
| 2010/0023885 A1 | 1/2010 | Reville et al. | |
| 2010/0115426 A1 | 5/2010 | Liu et al. | |
| 2010/0162149 A1 | 6/2010 | Sheleheda et al. | |
| 2010/0203968 A1 | 8/2010 | Gill et al. | |
| 2010/0227682 A1 | 9/2010 | Reville et al. | |
| 2011/0093780 A1 | 4/2011 | Dunn | |
| 2011/0115798 A1 | 5/2011 | Nayar et al. | |
| 2011/0148864 A1 | 6/2011 | Lee et al. | |
| 2011/0239136 A1 | 9/2011 | Goldman et al. | |
| 2012/0113106 A1 | 5/2012 | Choi et al. | |
| 2012/0124458 A1 | 5/2012 | Cruzada | |
| 2012/0130717 A1 | 5/2012 | Xu et al. | |
| 2012/0253489 A1* | 10/2012 | Dugan | G09B 19/00 700/91 |
| 2013/0103760 A1 | 4/2013 | Golding et al. | |
| 2013/0201187 A1 | 8/2013 | Tong et al. | |
| 2013/0249948 A1 | 9/2013 | Reitan | |
| 2013/0257877 A1 | 10/2013 | Davis | |
| 2014/0043329 A1 | 2/2014 | Wang et al. | |
| 2014/0055554 A1 | 2/2014 | Du et al. | |
| 2014/0125678 A1 | 5/2014 | Wang et al. | |
| 2014/0129343 A1 | 5/2014 | Finster et al. | |
| 2015/0198738 A1 | 7/2015 | Gupta | |
| 2015/0206349 A1 | 7/2015 | Rosenthal et al. | |
| 2015/0331589 A1* | 11/2015 | Kawakita | G06F 1/163 715/834 |
| 2016/0134840 A1 | 5/2016 | Mcculloch | |
| 2016/0234149 A1 | 8/2016 | Tsuda et al. | |
| 2017/0080346 A1 | 3/2017 | Abbas | |
| 2017/0087473 A1 | 3/2017 | Siegel et al. | |

(56) References Cited

U.S. PATENT DOCUMENTS

| | | |
|---|---|---|
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Dusen et al. |
| 2017/0249056 A1* | 8/2017 | Rainey .................. G06Q 50/26 |
| 2017/0310934 A1 | 10/2017 | Du et al. |
| 2017/0312634 A1 | 11/2017 | Ledoux et al. |
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0188920 A1 | 6/2019 | McPhee et al. |
| 2019/0304159 A1* | 10/2019 | Dai .................. G08G 1/09675 |
| 2019/0312830 A1* | 10/2019 | Young .................. G06T 19/20 |

FOREIGN PATENT DOCUMENTS

| | | | |
|---|---|---|---|
| EP | 2184092 | A2 | 5/2010 |
| JP | 2001230801 | A | 8/2001 |
| JP | 5497931 | B2 | 3/2014 |
| KR | 20070070646 | A | 7/2007 |
| KR | 101445263 | B1 | 9/2014 |
| WO | WO-2003094072 | A1 | 11/2003 |
| WO | WO-2004095308 | A1 | 11/2004 |
| WO | WO-2006107182 | A1 | 10/2006 |
| WO | WO-2007134402 | A1 | 11/2007 |
| WO | WO-2008154622 | A1 | 12/2008 |
| WO | WO-2012139276 | A1 | 10/2012 |
| WO | WO-2013027893 | A1 | 2/2013 |
| WO | WO-2013152454 | A1 | 10/2013 |
| WO | WO-2013166588 | A1 | 11/2013 |
| WO | WO-2014031899 | A1 | 2/2014 |
| WO | WO-2014194439 | A1 | 2/2014 |
| WO | WO-2016090605 | A1 | 6/2016 |
| WO | WO-2018081013 | A1 | 5/2018 |
| WO | WO-2018102562 | A1 | 6/2018 |
| WO | WO-2018129531 | A1 | 7/2018 |
| WO | WO-2019089613 | A1 | 7/2018 |

OTHER PUBLICATIONS

"International Application Serial No. PCT/US2020/019912, Written Opinion dated Jun. 29, 2020", 5 pgs.

* cited by examiner

US 10,964,082 B2

AVATAR BASED ON WEATHER

TECHNICAL FIELD

The present disclosure relates generally to generating avatars and providing weather information.

BACKGROUND

Weather sites are some of the most popularly, if not the most popularly, visited sites on the Internet. Weather affects our daily lives and it is no surprise that people use the Internet to obtain weather information. Local conditions and forecasts are typically assembled into web pages for each city or location. A consumer visiting a weather site on the Internet, or through an app installed on a mobile device, can then enter a city or a zip code and obtain the local forecast and current conditions for that city. Such weather conditions are typically presented in a generic form indicating the temperature and likelihood of rain/snow.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
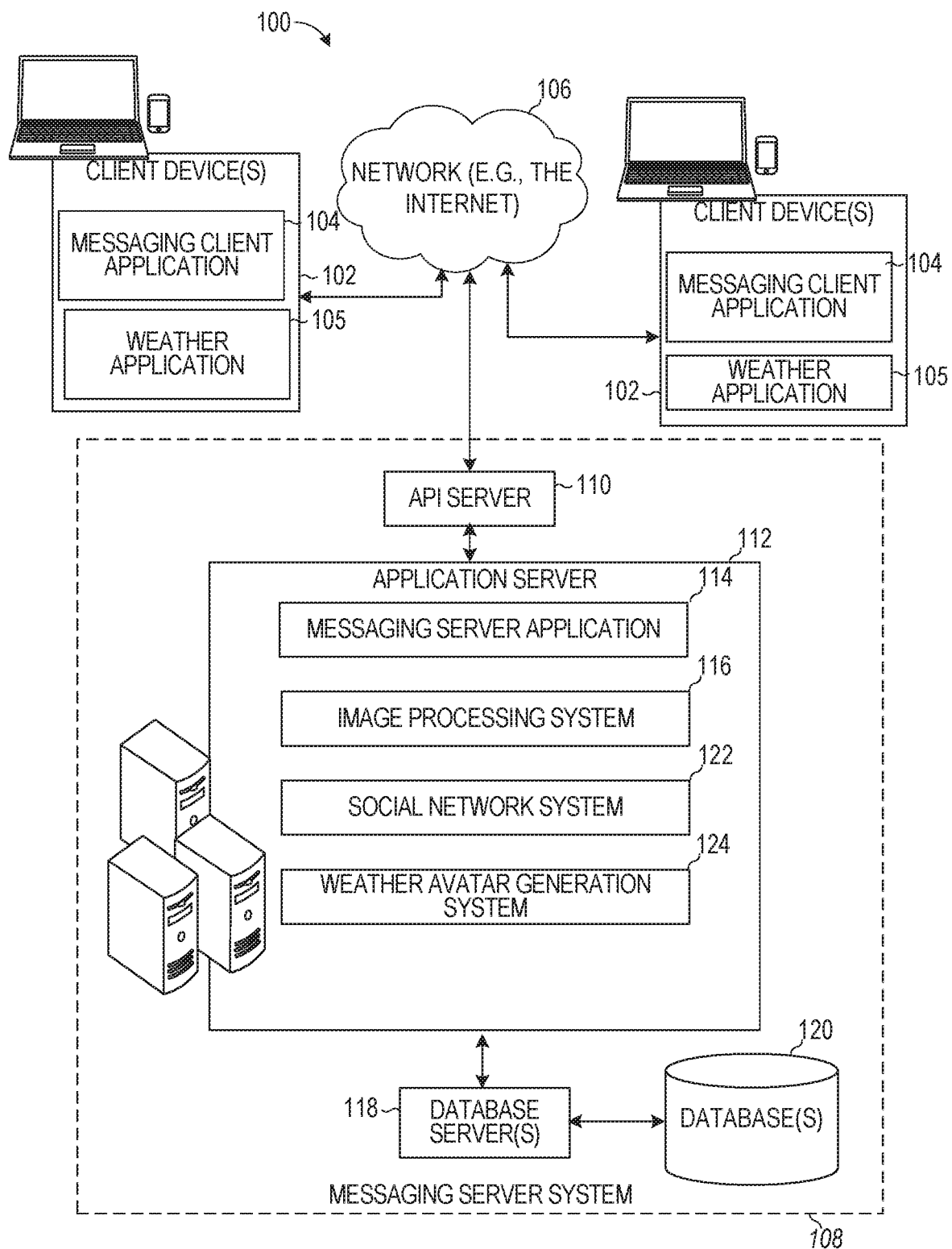
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Typically, weather information is presented to a user in generic form specifying the current temperature and the likelihood of rain/snow at a particular location. While such systems work well for presenting weather information generically, the lack of visual appeal or connection to a specific user makes them less attractive and less intuitive to use, which increases their overall complexity. This is because simply knowing the temperature and likelihood of rain/snow may not be enough for every user to fully appreciate the significance of the weather conditions (e.g., to choose appropriate clothing or determine the severity of the conditions). For example, a user who lives in a location that is warm year-round may not appreciate the significance of temperatures that are below 40 degrees Fahrenheit to choose temperature-appropriate clothing.

Also, typical weather applications and websites require the user to input a specific location to determine the weather conditions at the location. Such interfaces make it challenging and burdensome for the user to look up weather information at other locations where the user's friends and family live. For example, the user needs to first select a friend, then the user needs to determine where the friend lives, and only then the user can input that friend's location to the weather website or app to retrieve weather information for the friend's location. Even still, when the user ultimately finds the weather information for the friend's location, the user may still not appreciate the severity of the weather conditions if the user is not typically exposed to such conditions. For example, a user who lives in a location that is warm year-round may not appreciate the significance of an upcoming snow storm where the user's friend lives.

The disclosed embodiments improve the efficiency of using the electronic device by incorporating one or more avatars into a weather application to visually depict weather conditions at one or more given locations. Specifically, according to some embodiments, a request is received from a user device for weather information. In response to this request, a weather condition at a current location of the user device is retrieved, and an avatar, associated with the user device, is generated that includes a visual attribute corresponding to the weather condition. For example, when the weather condition is rain at the current location of the user device, an avatar, representing the user of the user device, is generated for display in which a face of the avatar appears to be grimacing and the avatar holds an umbrella. In some embodiments, the avatar can be placed on a background that shows the rainy weather condition, and the avatar and background are presented together to the user with a visual representation of the weather conditions.

By presenting to a user the requested weather information for a given location together with an avatar having attributes associated with the weather condition at the given location, the user is provided with a clearer understanding and appreciation for the significance of the weather condition. Namely, with minimal user input, the user obtains the weather conditions at the requested location and can visually ascertain (through the avatar showing someone's clothing, actions, and facial expressions) what it feels like to be exposed to those weather conditions.

In some embodiments, weather information at locations where the user has friends or family is provided in one or more pages associated with the friends or family. Such weather information is presented in each page using one or more avatars of the friends or family having attributes associated with the weather conditions at their locations. To see what the current or future weather conditions are at the location(s) where the user has friends or family, the user accesses the corresponding page for the friend or family member by performing a particular gesture, such as swiping left or right across the screen. Also, sets of friends or family that live in the same location or within a specified range of the same location are grouped into the same page. In this way, rather than paging through multiple screens of information to obtain weather information for one location where a user's friend or family member lives, meaningful weather information, including avatars representing the weather using visual attributes, is presented to the user quickly and simply by performing a given gesture that navigates to the page containing the weather information for the friend or family member's location.

In some embodiments, to further enhance the speed and simplicity of accessing relevant weather information for the user's friends or family members' locations, the pages are sorted and organized based on user interest in the friend or family member and/or severity of the weather conditions at the location. For example, if an out of the ordinary occurrence of weather (e.g., a blizzard or hurricane or other weather condition that is different from the average or normal weather conditions) at a given location is determined, the page associated with that location is repositioned and sorted in the sequence ahead of the other pages. This way, as the user navigates through the different pages containing weather information for different locations where the user's friends and family live, the page for the location where the out of the ordinary occurrence of weather is determined will be reached and presented first or before the other pages. Also, this page, when the out of the ordinary occurrence of weather is determined, may include an option for the user to send a message to the friends and family who live at the location associated with the page. In some implementations, when the out of the ordinary occurrence of weather is determined for a given location, the page associated with that location is automatically presented to the user as an initial landing page when the user accesses or launches the weather application.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104 and a weather application 105. Each messaging client application 104 is communicatively coupled to other instances of the messaging client application 104, the weather application 105, and a messaging server system 108 via a network 106 (e.g., the Internet).

Accordingly, each messaging client application 104 and weather application 105 is able to communicate and exchange data with another messaging client application 104 and weather application 105 and with the messaging server system 108 via the network 106. The data exchanged between messaging client applications 104, weather applications 105, and between a messaging client application 104 and the messaging server system 108 includes functions (e.g., commands to invoke functions) as well as payload data (e.g., text, audio, video, or other multimedia data).

The weather application 105 is an application that includes a set of functions that allow the client device 102 to access the weather avatar generation system 124. In some implementations, the weather application 105 is a component or a feature that is part of the messaging client application 104. Weather application 105 allows a user to access weather information for a location of the user and/or for locations where the user's friends and family live. The weather application 105 retrieves the weather conditions at the user's location, by accessing weather avatar generation system 124, and presents those weather conditions together with an avatar having attributes associated with the current weather conditions. For example, if the weather application 105 determines that it is currently raining at the user's location or if rain is in the forecast, the weather application 105 indicates the likelihood of rain and presents an avatar of the user having a facial expression that is grimacing while holding an umbrella. The weather application 105 may retrieve an avatar associated with the user and access avatar attributes associated with the current weather from the weather avatar generation system 124. Using the avatar attributes, obtained from weather avatar generation system 124, the weather application 105 adjusts properties or attributes of the retrieved avatar to have the retrieved attributes associated with the weather.

The embodiments discussed herein are examples of providing weather information using avatars in a weather application 105. It should be understood that the same type of information can be provided to a user in any other type of application. For example, the same techniques could be employed in other social media applications. In such circumstances, user avatars depicting weather in a given location can be presented in a chat interface, a social media activity or data feed, or on a map-based interface that depicts a user's friends' avatars on a map based on their present location. In the map-based interface, each avatar of the user's friend may be modified to depict attributes associated with weather at the location of the avatar.

In some embodiments, the weather application 105 determines a current context of the client device 102 being used by the user. For example, the weather application 105 determines that the client device 102 is in a car or an airplane. In such circumstances, the weather application 105 retrieves a graphic associated with the context (e.g., an image of a convertible car) and adjusts an attribute of the graphic to match the current weather conditions. For example, if the weather application 105 determines it is currently raining, the weather application 105 presents the car with the top of the convertible up and the windshield wipers on. On the other hand, if the weather application 105 determines it is currently sunny, then the weather application 105 presents the car with the top of the convertible down. The weather application 105 inserts the avatar having the attributes associated with the weather condition in the current context (e.g., inside of the car having the attributes associated with the weather).

In some embodiments, the weather application 105 retrieves a background associated with the current weather conditions. The weather application 105 presents the avatar with the attributes associated with the current weather conditions and/or the graphic representing the current context of the client device 102 together.

In some embodiments, the weather application 105 presents weather conditions at locations in which the user's friends/family lives. Such weather conditions are presented in the form of individual pages that are dedicated to specific locations. The user may initially select a group of users that includes the user's friends/family, and the weather application 105 may determine the locations of each of the selected friends/family. The locations may be determined by communicating with the messaging client application 104 and/or social network system 122 in which profiles of the selected friends/family are stored. For each unique location or for each location that exceeds a specified threshold, the weather application 105 generates a separate page. The pages are sequentially arranged based on importance or interest level the user has in the friends at a given location associated with the page and/or based on the number of friends/family members the user has at the location. For example, if a user has ten friends in Los Angeles and three friends in New York, then the page associated with Los Angeles is positioned earlier in the sequence of pages than the page for New York.

The user navigates between the different pages by performing a specific gesture (e.g., swiping left/right across the screen). When a given page is accessed, weather information for the location associated with the page is presented together with one or more avatars of the friends/family members who live at the location associated with the page. Each of the avatars presented on the page may include attributes associated with the current weather conditions at the location. For example, if the user navigates to a page associated with the city of Los Angeles where ten of the user's friends live, the weather application 105 presents ten different avatars representing each of those friends. The ten avatars may be presented in beachwear and playing beach volleyball when the weather application 105 determines that the current weather condition in Los Angeles is sunny with temperatures above 75 degrees Fahrenheit. If the user subsequently navigates to another page associated with the city of New York, where three of the user's friends live, the weather application 105 presents three different avatars representing each of those three friends. The three avatars may be presented in coats with frowns on their faces when the weather application 105 determines that the current weather condition in New York is cold and rainy with temperatures below 45 degrees Fahrenheit.

In some embodiments, the weather application 105 receives an alert from the weather avatar generation system 124 indicating that out of the ordinary weather conditions have been detected at a location associated with one of the pages of the weather application 105. An out of the ordinary weather condition may be a weather condition that differs from a historical average of weather conditions for the same time period (e.g., the same month, season, or day) by more than a specified amount. For example, the weather avatar generation system 124 transmits an alert to the weather application 105 indicating that a blizzard was detected in the city of New York, where the user's three friends live. In such circumstances, the weather application 105 reorganizes the pages of the weather application 105 to position the page associated with the city of New York ahead of all or some of the other pages (e.g., the page associated with the city of Los Angeles).

In some implementations, the page associated with the city of New York may be positioned as the first page of the weather application 105 in response to receiving the alert indicating the out of the ordinary weather condition. The page may indicate that an out of the ordinary weather condition is present at the city of New York and may include the three avatars with attributes associated with that out of the ordinary weather condition. The page may now also include an option to send a message to all or a selected subset of the friends/family members who live at the location associated with the displayed page. In response to receiving a user selection of the option, the user can compose a message to send to the selected friends/family members using the messaging client application 104.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the messaging server application 114, and for possible access by another messaging client application 104; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and the weather avatar generation system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by the weather avatar generation system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends. Social network system 122 may access location information associated with each of the user's friends to determine where they live or are currently located geographically. Social network system 122 may maintain a location profile for each of the user's friends indicating the geographical location where the user's friends live.

The application server 112 is communicatively coupled to a database server 118, which facilitates access to a database 120 in which is stored data associated with messages processed by the messaging server application 114.

Figure 2:
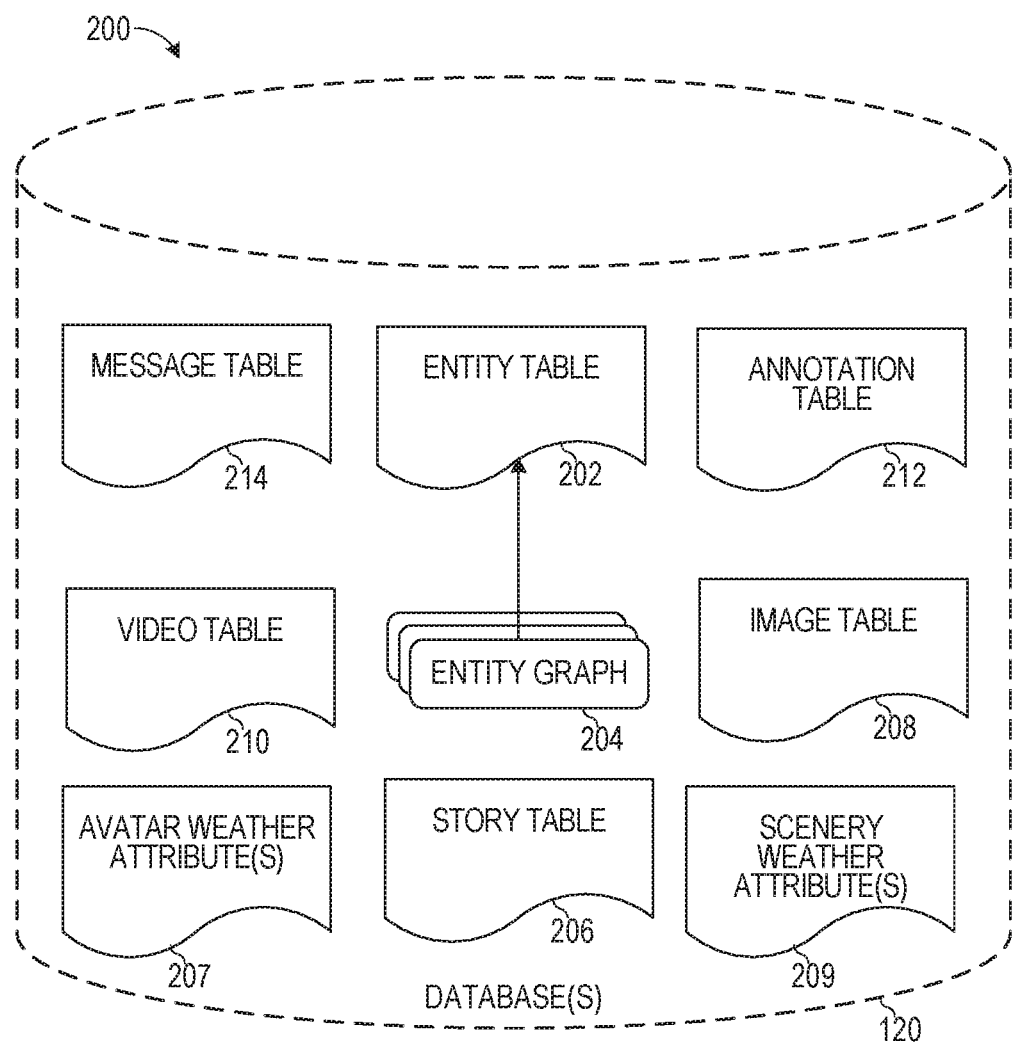
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 furthermore stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

Avatar weather attribute(s) 207 stores avatar attributes or parameters the weather avatar generation system 124 uses to generate avatars representing different weather conditions. For example, avatar weather attribute(s) 207 associates a first plurality of avatar attributes for a first weather condition and a second plurality of avatar attributes for a second weather condition. The avatar attributes may specify facial expressions, animation characteristics, avatar accessories (e.g., umbrella), avatar clothing, and avatar poses. Each weather condition may include a different set or combinations of different attributes. The avatar attributes may be stored as generic instructions that are used to modify a specific avatar to depict the given set of avatar attributes. For example, a first avatar that includes features specific to a first user (e.g., hair style and skin color) may be adjusted based on a first set of avatar attributes to depict a certain pose and have a certain set of clothing associated with the first set of avatar attributes. A second avatar that includes features specific to a second user may be adjusted based on the same first set of avatar attributes to depict the same certain pose and have the same certain set of clothing associated with the first set of avatar attributes as the first avatar while maintaining the features that are unique to the second user.

Avatar weather attribute(s) 207 may store graphic or context attributes the weather avatar generation system 124 uses to generate graphic representations of contexts. For example, avatar weather attribute(s) 207 may store a first set of parameters for a car driving in a first weather condition (e.g., rainy weather) and a second set of parameters for a car driving in a second weather condition (e.g., sunny weather). The first set of parameters may indicate that windshield wipers are running and the top of the convertible car is up while the second set of parameters may indicate that the top of the convertible car is down or open.

Scenery weather attribute(s) 209 may store backgrounds the weather avatar generation system 124 uses to provide weather information using an avatar. For example, scenery weather attribute(s) 209 associates a first plurality of backgrounds for a first weather condition and a second plurality of backgrounds for a second weather condition. The first weather condition may be light rainy weather and, in such cases, the first plurality of backgrounds may include one background depicting a rainbow and a sun and another background depicting gray clouds blocking the sun. The second weather condition may be snowy weather and, in such cases, the second plurality of backgrounds may include one background depicting snow falling from the sky and another background depicting a snowman on the ground.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
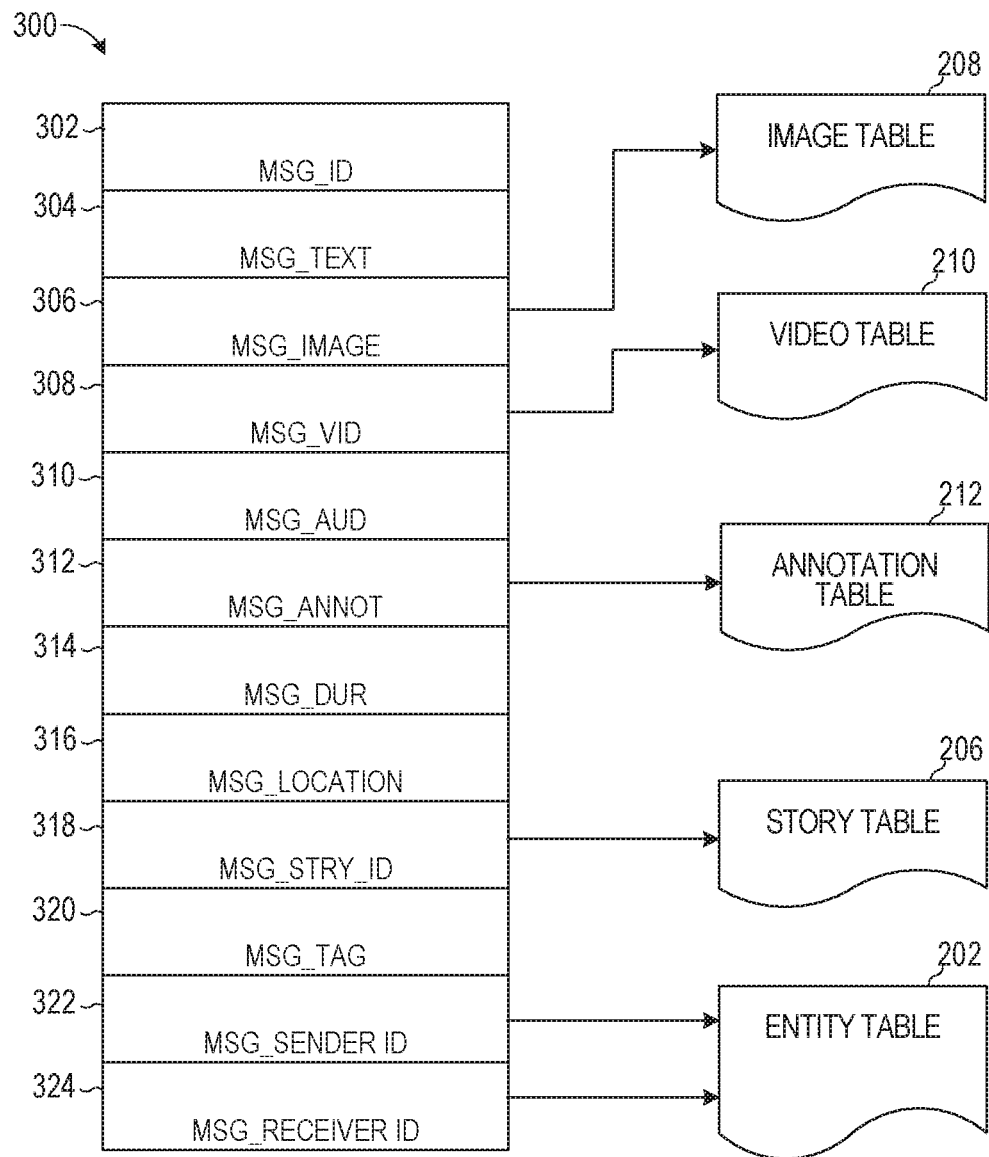
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a UI of the client device 102 and that is included in the message 300.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from the memory component of the client device 102, and that is included in the message 300.

Message annotations 312: annotation data (e.g., filters, stickers, or other enhancements) that represents annotations to be applied to message image payload 306, message video payload 308, or message audio payload 310 of the message 300.

A message duration parameter 314: parameter value indicating, in seconds, the amount of time for which content of the message (e.g., the message image payload 306, message video payload 308, message audio payload 310) is to be presented or made accessible to a user via the messaging client application 104.

A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).

A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
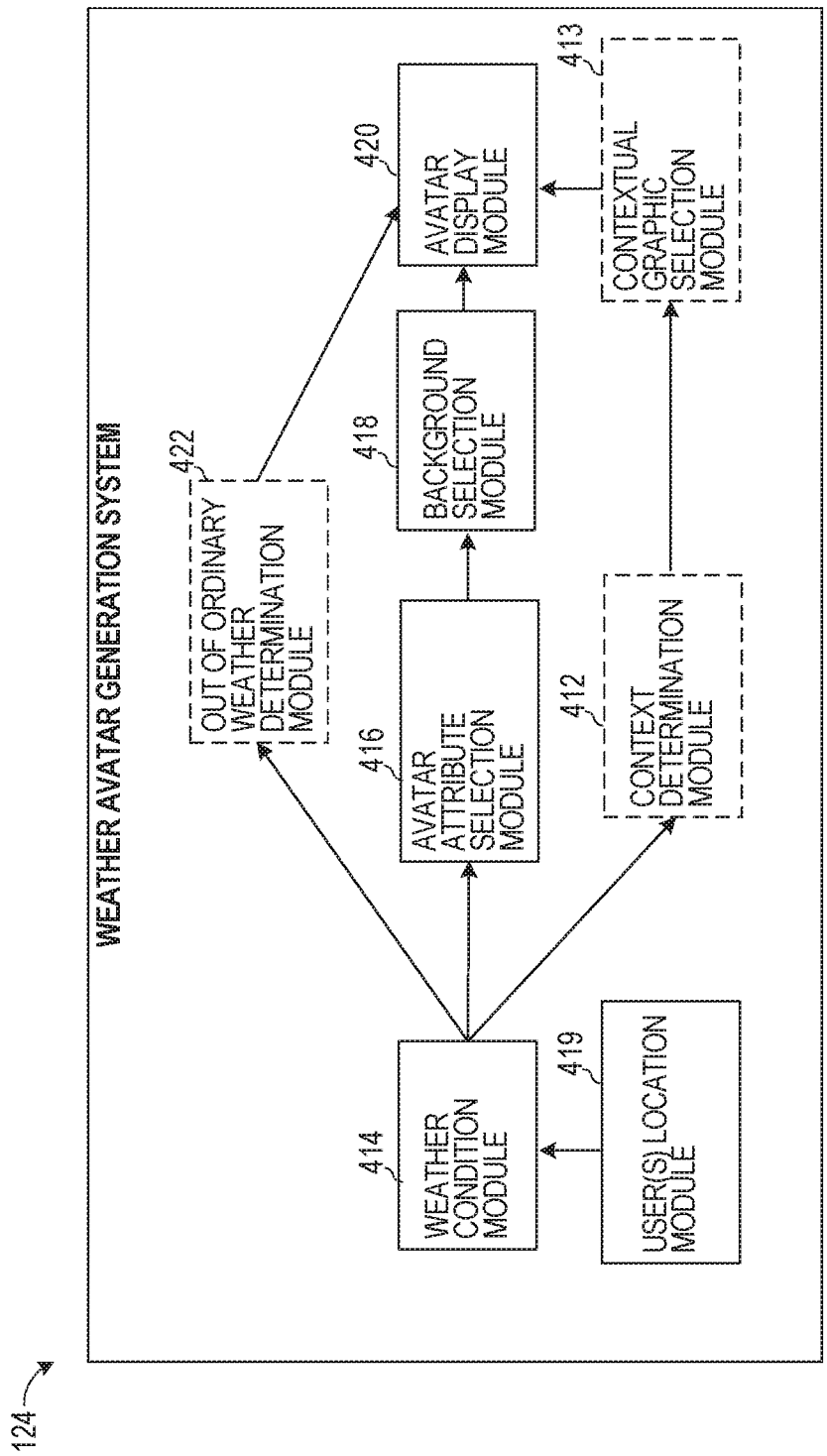
FIG. 4 is a block diagram showing an example weather avatar generation system, according to example embodiments.

FIG. 4 is a block diagram showing an example weather avatar generation system 124, according to example embodiments. Weather avatar generation system 124 includes a weather condition module 414, a user(s) location module 419, an avatar attribute selection module 416, a background selection module 418, and an avatar display module 420. Weather avatar generation system 124 optionally also includes an out-of-ordinary weather determination module 422, a context determination module 412, and a contextual graphic selection module 413.

User(s) location module 419 accesses a list of friends/family members the user specifies for inclusion in the weather application 105. Specifically, the user may open the weather application 105 and choose an option to add friends. The add friends option may retrieve from the social network system 122 a list of all the user's friends. The user may choose which friends the user is most interested in including in the weather application 105. In particular, any friend that is selected from this list may be used to generate a corresponding page for the location associated with the selected friend. User(s) location module 419 accesses the list of friends and communicates with the social network system 122 to determine the geographical location of each selected friend.

In some implementations, the geographical location obtained by the user(s) location module 419 represents the live current location of a device associated with each accessed friend and/or a pre-stored or pre-specified location associated with that friend representing where the friend lives or resides. The user(s) location module 419 may group friends selected by the user based on similarity in their locations. For example, friends that are associated with a given location that is within a specified range (e.g., less than 50 miles) of a given city may be grouped together. The specified range may be input by a user or may be selected by an operator of the weather avatar generation system 124. The user(s) location module 419 may output a plurality of groups of friends in which each one of the groups is associated with the same common location. The user(s) location module 419 generates a different page for each group of friends so that each page represents a given location.

The pages generated by the user(s) location module 419 are provided to the weather condition module 414 together with the current geographical location or pre-specified location of the user of the client device 102. The weather condition module 414 accesses a third-party website or application to obtain weather information for each of the locations associated with the pages provided by user(s) location module 419. For example, the weather condition module 414 may determine that the user of the client device 102 is currently in New York and, accordingly, obtains weather conditions including a weather forecast for the city of New York from a third-party website of weather application. The weather condition module 414 may determine that one group of friends indicated by user(s) location module 419 is associated with a page representing the city of Los Angeles and, according, the weather condition module 414 may communicate with a third-party weather website or application to obtain weather conditions (e.g., current weather and/or forecast of weather conditions) for the city of Los Angles. In some embodiments, the weather condition module 414 may obtain the weather conditions in real-time on an on-going basis, periodically, or in response to receiving a user request to access the weather application 105.

The weather condition module 414 provides the weather conditions to the avatar attribute selection module 416, the out-of-ordinary weather determination module 422, and the context determination module 412. Avatar attribute selection module 416 accesses the avatar weather attribute(s) 207. Specifically, avatar attribute selection module 416 retrieves from the avatar weather attribute(s) 207 the list of avatar attributes associated with the weather conditions received from the weather condition module 414. The avatar attribute selection module 416 selects one of the attributes, obtained from the avatar weather attribute(s) 207, associated with the weather conditions randomly, pseudo randomly, or in a cyclical manner (e.g., in a sequential manner).

In some embodiments, the avatar attribute selection module 416 determines that multiple users are represented by a given page associated with the same weather conditions. For example, three users may be associated with the city of Los Angeles page for which the current weather condition indicated by weather condition module 414 is sunny. In such cases, the avatar attribute selection module 416 randomly, pseudo randomly, or in a cyclical manner selects three different avatar attributes from avatar weather attribute(s) 207 associated with the sunny weather condition. In some embodiments, more than one avatar can be displayed together for a given location (e.g., on a single page) based on multiple different avatar attributes that are selected.

The avatar attribute selection module 416 obtains the avatars associated with the specific users represented by a given page. For example, the avatar attribute selection module 416 obtains the avatar of the user of the client device 102 represented by a first page and obtains three avatars of three users represented by a second page corresponding to the city of Los Angeles. The avatar attribute selection module 416 modifies the obtained avatars to include the attributes selected from avatar weather attribute(s) 207. For example, the avatar attribute selection module 416 adjusts a pose, accessories, and clothing of a given avatar to represent the weather conditions of the location represented by the page in which the avatar is presented.

The avatar attribute selection module 416 provides the weather conditions and the modified avatars of each page to the background selection module 418. Background selection module 418 accesses the scenery weather attribute(s) 209. Specifically, background selection module 418 retrieves from the scenery weather attribute(s) 209 the list of backgrounds associated with the weather conditions received from the avatar attribute selection module 416. The background selection module 418 selects one of the backgrounds, obtained from the scenery weather attribute(s) 209, associated with the weather conditions randomly, pseudo randomly, or in a cyclical manner (e.g., in a sequential manner). The background selection module 418 selects a different background from the scenery weather attribute(s) 209 for each page for which weather conditions are obtained.

The background selection module 418 combines the modified avatars provided by the avatar attribute selection module 416 with the corresponding background that is selected. For example, a given page corresponds to the city of Los Angeles where three of the user's friends live. In such cases, the avatar attribute selection module 416 generates three avatars depicting the three friends in beachwear playing volleyball (e.g., having volleyball-specific poses) and the background selection module 418 selects the beach as the background. The background selection module 418 combines the three avatars in the beachwear playing volleyball on a sandy beach background.

The background selection module 418 provides the combined avatars and background for each page to the avatar display module 420. Avatar display module 420 arranges the received backgrounds and avatars into a collection or set of pages of the weather application 105. For example, avatar display module 420 presents, as a first page, the avatar of the user of the client device 102 having attributes associated with the weather condition at the user's location together with the background representing the weather condition at the user's location. The avatar display module 420 may present, as a second page, the three avatars associated with the users who live in Los Angeles or within a specified range of Los Angeles having the attributes associated with the current weather condition in Los Angeles combined with the background representing that weather condition.

Context determination module 412 accesses social network system 122 to obtain current context information for users selected to be included in the weather application 105. In some embodiments, context determination module 412 communicates with devices of each user selected to be included in the weather application 105 to infer context. For example, the context determination module 412 may communicate with an accelerometer of a given user device to determine a speed at which the device is moving. If the speed exceeds a first specified amount, the context determination module 412 determines that the device and user are in a car. If the speed exceeds a second specified amount greater than the first amount, the context determination module 412 determines that the device and user are in an airplane. As another example, context determination can be based on location alone or in combination with speed. For example, context determination module 412 may determine the user is located at sea or on a lake, and in response, an avatar is rendered depicting the user on a boat, yacht, or the like.

The context determination module 412 provides the determined context to the contextual graphic selection module 413 which retrieves a graphic representing the determined context (e.g., an avatar of a car or a plane). The context determination module 412 provides the determined context and the current weather condition to the avatar weather attribute(s) 207 to obtain graphic attributes associated with the weather condition. The contextual graphic selection module 413 chooses a given graphic attribute from the avatar weather attribute(s) 207 and modifies the graphic based on the chosen graphic attribute. For example, the contextual graphic selection module 413 modifies a graphic representing a car avatar to have the roof down or open when the weather conditions are sunny and modifies the graphic representing the car avatar to have the roof up or closed and animates windshield wipers when the weather conditions are rainy. As another example, the contextual graphic selection module 413 modifies a graphic representing a boat on the water with rough water conditions rainy weather) or calm water conditions (in sunny weather).

The modified avatar is provided to the avatar display module 420, which integrates one or more avatars on a given page with the modified graphic. For example, the avatar display module 420 identifies which avatar on a given page is associated with the graphic received from contextual graphic selection module 413. The avatar display module 420 may then insert the avatar into the modified graphic on the page. For example, in sunny conditions, the avatar display module 420 generates a page in which an avatar dressed in beachwear is added or placed inside of the car avatar having the roof open or top down.

Out-of-ordinary weather determination module 422 receives the weather condition for each location for which a page is generated from the weather condition module 414. The out-of-ordinary weather determination module 422 compares the weather conditions to historical averages at the corresponding locations to determine whether the current conditions differ from the historical averages by more than a specified amount. For example, the out-of-ordinary weather determination module 422 stores a database of historical weather averages for various geographical locations. The averages may be for any time frame, such as seasonal averages, daily averages, monthly averages or yearly averages.

In one example, the out-of-ordinary weather determination module 422 may determine that the current weather conditions for a given city (e.g., Los Angeles) for which a page is generated include temperatures exceeding 99 degrees Fahrenheit. The out-of-ordinary weather determination module 422 retrieves the average daily temperature for the current day or month of the year from the historical averages that are stored and determines that the average temperature for Los Angeles for the time of year is 65 degrees Fahrenheit. The out-of-ordinary weather determination module 422 may determine that the current weather condition in Los Angeles is greater than the average by more than 20 degrees Fahrenheit and accordingly may generate an indication or alert that this weather condition is out of the ordinary.

In another example, the out-of-ordinary weather determination module 422 may determine that the current weather conditions for a given city (e.g., New York) for which a page is generated include temperatures lower than negative 5 degrees Fahrenheit. The out-of-ordinary weather determination module 422 retrieves the average daily temperature for the current day or month of the year from the historical averages that are stored and determines that the average temperature for New York for the time of year is 32 degrees Fahrenheit. The out-of-ordinary weather determination module 422 may determine that the current weather condition in New York is lower than the average by more than 15 degrees Fahrenheit and accordingly may generate an indication or alert that this weather condition is out of the ordinary.

In another example, the out-of-ordinary weather determination module 422 may determine that the current weather conditions for a given city (e.g., New York) for which a page is generated include more than 25 inches of snow. The out-of-ordinary weather determination module 422 retrieves the average daily snow conditions for the current day or month of the year from the historical averages that are stored and determines that the average snow conditions for New York for the time of year is 2 inches of snow. The out-of-ordinary weather determination module 422 may determine that the current weather condition in New York is more than the average by more than 10 inches of snow and accordingly may generate an indication or alert that this weather condition is out of the ordinary.

The alert or indication of the out-of-ordinary weather condition is provided to the avatar display module 420. Avatar display module 420 may re-arrange the pages or sort the pages based on this alert or indication. For example, the out-of-ordinary weather determination module 422 indicates that New York has out of the ordinary weather conditions. In such circumstances, the avatar display module 420 positions or places the page associated with the city of New York ahead of all the other pages associated with other cities. This way, as the user navigates from the first page of the weather application 105 to subsequent pages, the page associated with the city of New York will be navigated to first and be presented before the pages of other cities.

Figure 5:
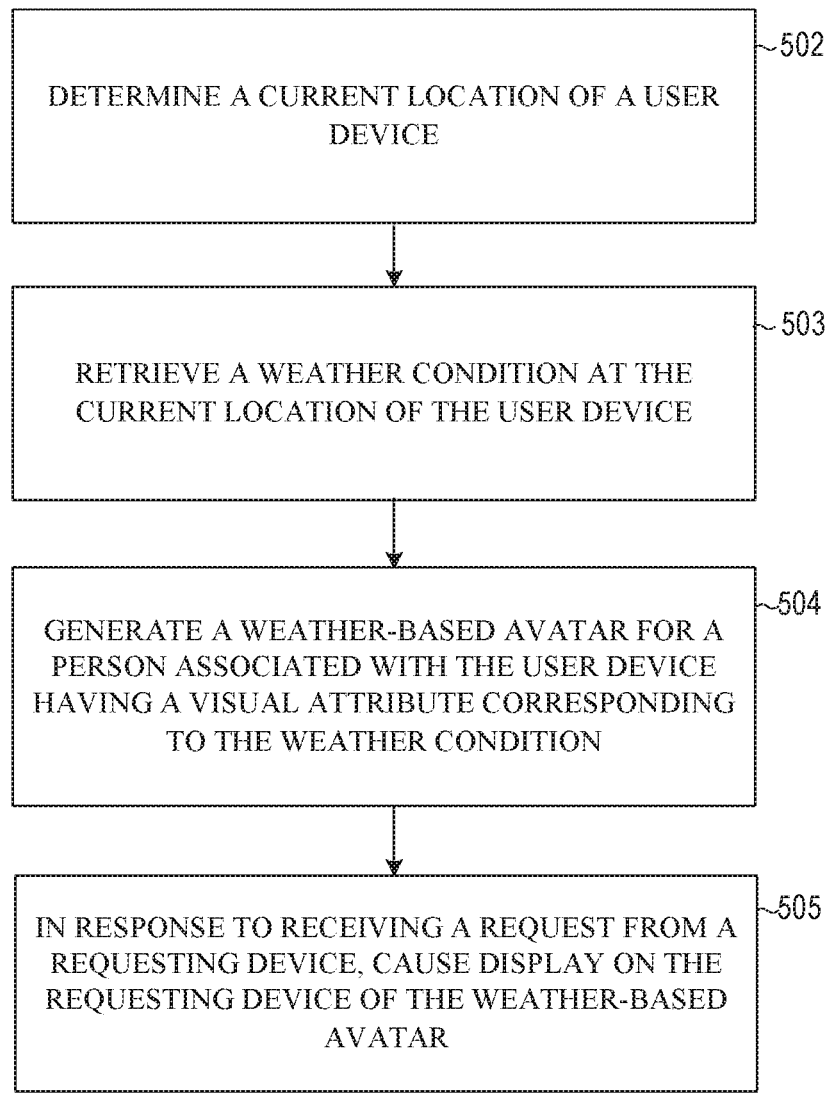
FIG. 5 is a flowchart illustrating example operations of the weather avatar generation system, according to example embodiments.
Figure 6A:
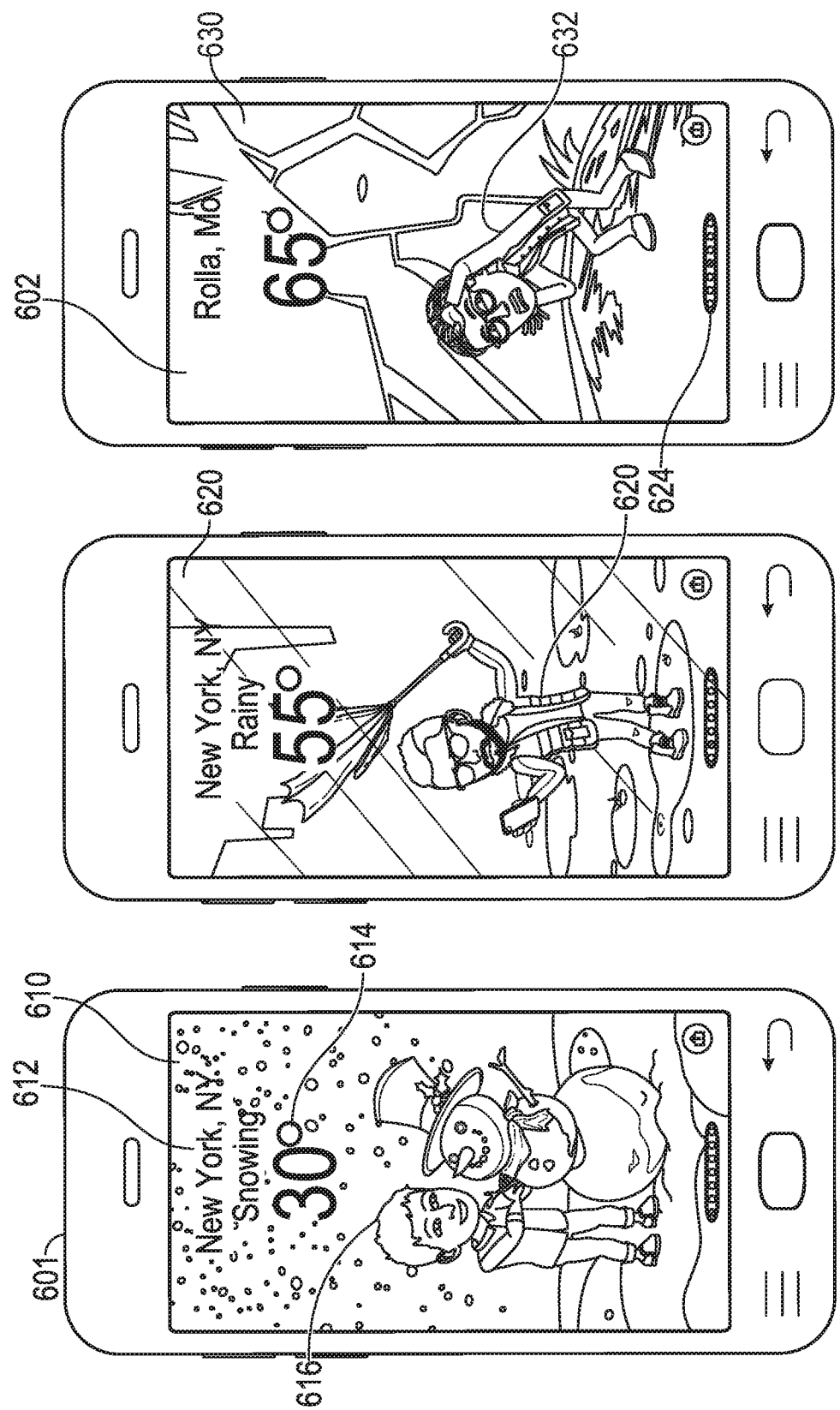
FIGS. 6A, 6B, 7 and 8 are illustrative inputs and outputs of the weather avatar generation system, according to example embodiments.
Figure 6B:
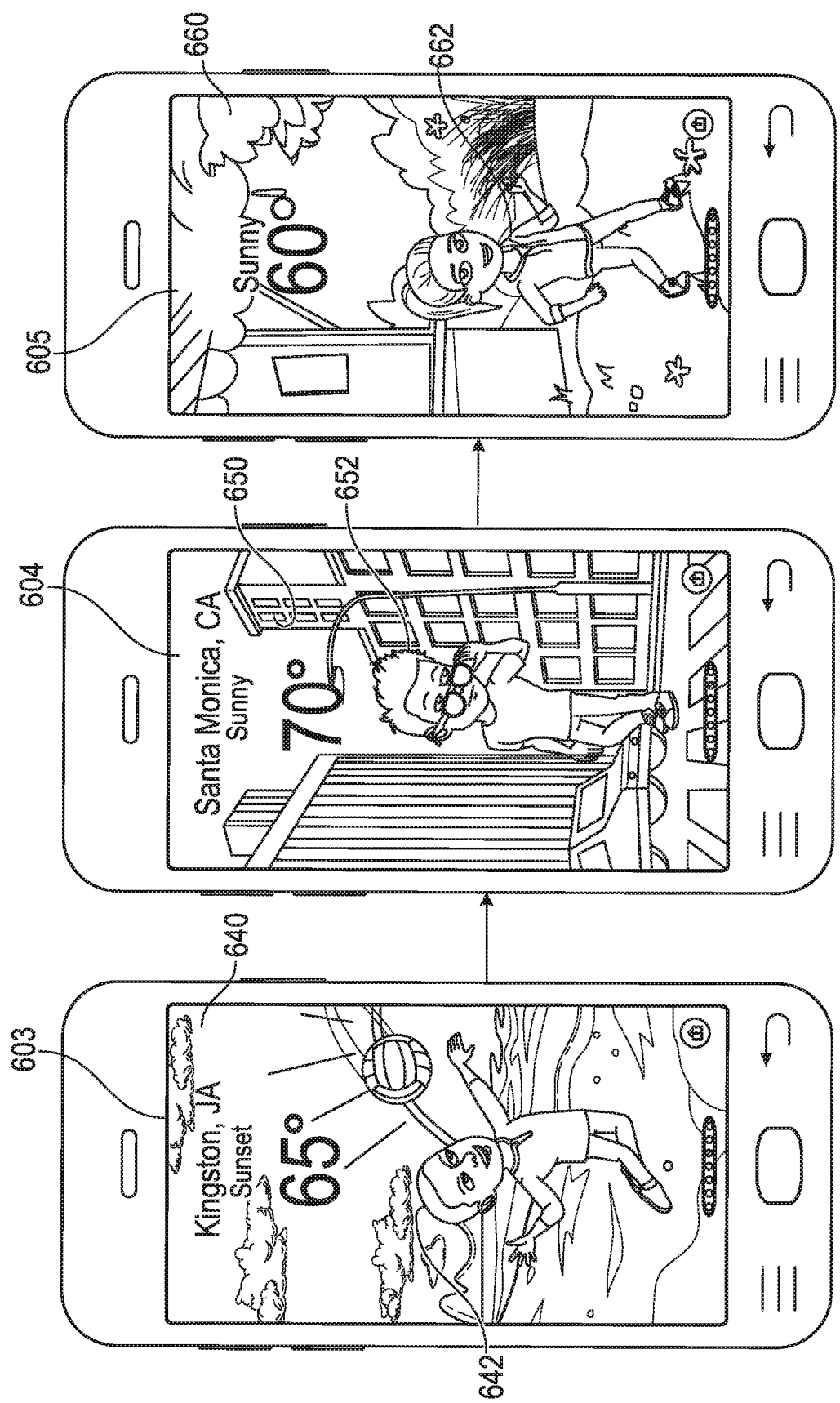

FIG. 5 is a flowchart illustrating example operations of the weather avatar generation system 124 in performing process 500, according to example embodiments. The process 500 may be embodied in computer-readable instructions for execution by one or more processors such that the operations of the process 500 may be performed in part or in whole by the functional components of the messaging server system 108 and/or weather application 105; accordingly, the process 500 is described below by way of example with reference thereto. However, in other embodiments, at least some of the operations of the process 500 may be deployed on various other hardware configurations. The process 500 is therefore not intended to be limited to the messaging server system 108 and can be implemented in whole, or in part, by any other component. Some or all of the operations of process 500 can be in parallel, out of order, or entirely omitted.

At operation 502, the weather avatar generation system 124 determines a current location of a user device. For example, the user(s) location module 419 determines a current location of the client device 102 (e.g., by obtaining GPS coordinates of the client device 102) of a user's friend(s).

At operation 503, the weather avatar generation system 124 retrieves a weather condition at the current location of the user device. For example, the weather condition module 414 determines a city associated with the current location of the client device 102 or GPS coordinates of the client device 102. The weather condition module 414 communicates with a third-party weather service (e.g., a website or third-party weather application) to obtain current weather conditions and/or a weather forecast for the determined city or GPS coordinates.

At operation 504, the weather avatar generation system 124 automatically generates a weather-based avatar for a person associated with the user device having a visual attribute corresponding to the weather condition. For example, avatar attribute selection module 416 receives the current weather conditions from the weather condition module 414 and selects avatar attributes associated with the received weather conditions. The selected avatar attributes are used to modify an avatar of the user's friend associated with the client device 102 to represent the weather conditions (e.g., a pose and clothing of the avatar are modified to represent the current weather conditions).

At operation 505, the weather avatar generation system 124, in response to receiving a request from a requesting device, causes display on the requesting device of the weather-based avatar. For example, the weather application 105 presents a page to a user of another client device 102 that includes the weather conditions (e.g., temperature) obtained by the weather condition module 414 and the modified avatar generated by the avatar attribute selection module 416.

FIGS. 6A, 6B, 7 and 8 show illustrative inputs and outputs of the weather avatar generation system 124, according to example embodiments. The inputs and outputs shown in FIGS. 6A, 6B, 7 and 8 can be implemented by the weather application 105. The weather application 105 may receive a user request for the weather. In response, the weather application 105 determines the user lives in New York and accesses weather information for the user's location. The weather application 105 generates a display 601 in which the user's current location 612 is indicated along with the current weather 614. The weather application 105 presents a background 610 associated with the current weather 614. In this case, the background 610 shows falling snow and a snowman because the current weather 614 indicates the temperature is 30 degrees Fahrenheit and snowing. The weather application 105 presents an avatar 616 with attributes associated with snowy weather (e.g., an avatar wearing a sweater and animated as playing with a snowman). On another day, the weather application 105 determines that the weather is rainy. In such circumstances, the weather application 105 presents a background 620 depicting rain and an avatar 620 that is grimacing and holding an umbrella.

In response to the weather application 105 receiving a gesture from the user swiping left, the weather application 105 accesses a second page in which an avatar 632 associated with the user's friend is presented in screen 602. An indicator 624 at the bottom of the screen 602 shows, using a number of dots, how many pages are available in the weather application 105 and highlights a given dot associated with the current page being shown. The weather application 105 determines that the user's friend lives in Montana, where the current weather includes thunderstorms. Accordingly, the background 630 depicts lightning and the avatar 632 of the friend is depicted crouching over in a scared pose.

In response to the weather application 105 receiving a gesture from the user swiping left, the weather application 105 accesses a third page in which an avatar associated with a second friend of the user is presented in screen 603. The weather application 105 determines that the second friend lives in Jamaica, where the current weather is sunny with temperatures above 60 degrees. Accordingly, a first background 640 of multiple backgrounds associated with such conditions (e.g., sunny with temperatures above 60 degrees) is selected in which a sunset is depicted and a beach. A first avatar attribute 642 of multiple avatar attributes associated with such conditions (e.g., sunny with temperatures above 60 degrees) is selected in which the avatar is playing volleyball and is used to modify the avatar of the second friend.

In response to the weather application 105 receiving a gesture from the user swiping left, the weather application 105 accesses a fourth page in which an avatar associated with a third friend of the user is presented in screen 604. The weather application 105 determines that the third friend lives in California, where the current weather is sunny with temperatures above 60 degrees. Accordingly, a second background 650 of multiple backgrounds associated with such conditions (e.g., sunny with temperatures above 60 degrees) is selected in which a city landscape with clear skies is depicted. A second avatar attribute 652 of multiple avatar attributes associated with such conditions (e.g., sunny with temperatures above 60 degrees) is selected in which short sleeves and sunglasses are worn and is used to modify the avatar of the third friend.

In response to the weather application 105 receiving a gesture from the user swiping left, the weather application 105 accesses a fifth page in which an avatar associated with a fourth friend of the user is presented in screen 605. The weather application 105 determines that the fourth friend lives in Washington state, where the current weather is sunny with temperatures above 60 degrees. Accordingly, a third background 660 of multiple backgrounds associated with such conditions (e.g., sunny with temperatures above 60 degrees) is selected in which flowers and trees are depicted. A third avatar attribute 662 of multiple avatar attributes associated with such conditions (e.g., sunny with temperatures above 60 degrees) is selected in which the avatar is jogging and is used to modify the avatar of the fourth friend.

Figure 7:
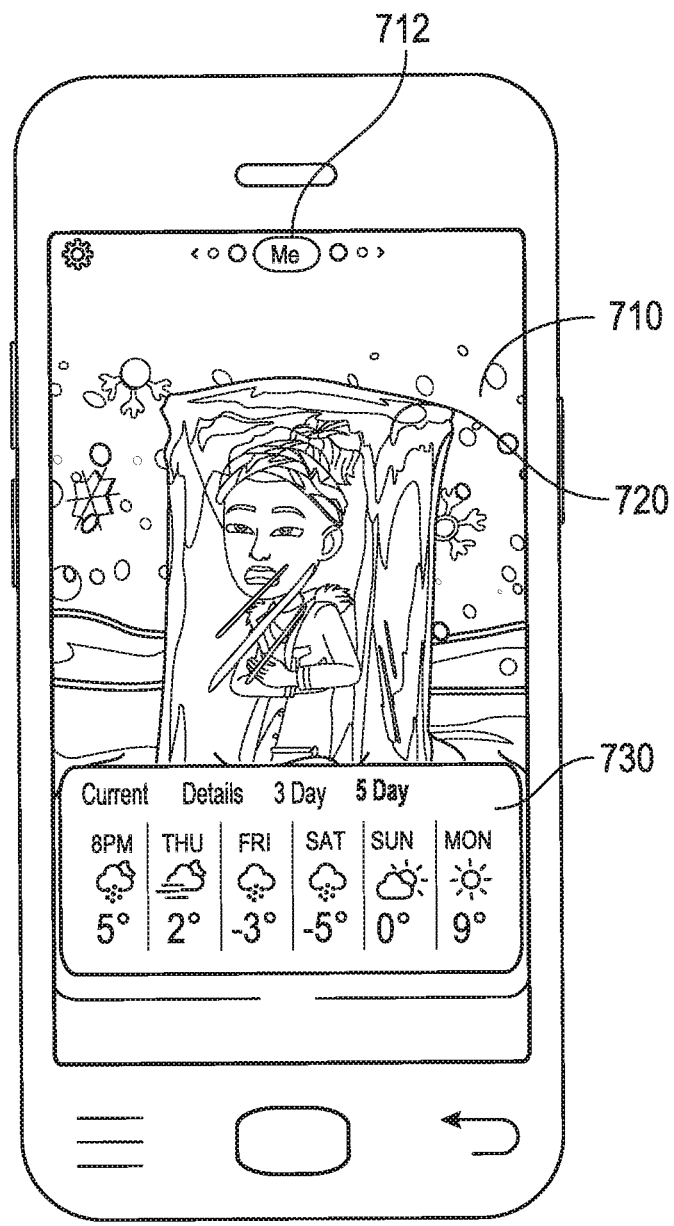
Figure 8:
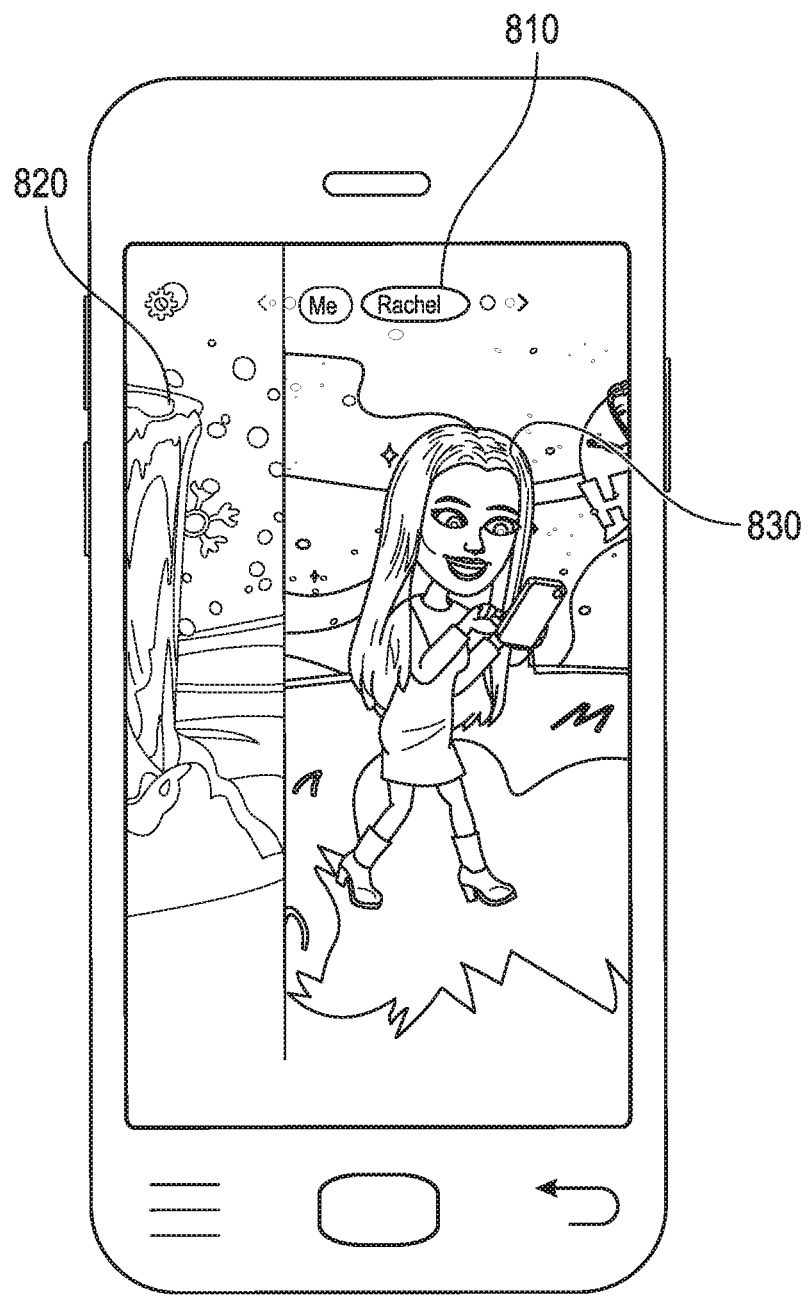

FIG. 7 shows another screen 710 for presenting weather information to a user in response to receiving a user request for weather information. The weather application 105 determines that the temperature where the user is located is below freezing. Accordingly, an avatar 720 is presented having attributes in which the avatar 720 is shivering inside of an ice cube. The avatar 720 is presented together with a weather forecast 730 for the next few days at the location. An indicator 712 is presented at the top of the screen 710 showing that the current page represents the user's location and including a number of dots indicating how many more pages of weather information including locations where the user's friends live are available. If the user swipes up or down, further weather details about the location corresponding to the current page is displayed. As the user swipes to the left, FIG. 8 shows the transition from the screen 710, in which the page representing the user's location is shown, to an adjacent page 820, in which a location of the user's friend is shown. The indicator 712 is updated to indicator 810 to identify the friend of the user for whom weather information is provided by specifying the name of the friend. An avatar 830 of the friend is also shown in page 820 having attributes associated with the weather at the location of the friend.

In some embodiments, the user can jump straight to a particular page by tapping on the corresponding dot of the page shown in indicator 810. Namely, rather than swiping a number of times to the left/right to reach a given page, the user can tap on the dot corresponding to the page the user would like to access. For example, if the user is on the first page and there are six total pages, the user can tap on the sixth dot while viewing the first page to access the sixth page directly rather than swiping five times to the left/right to reach that page.

Figure 9:
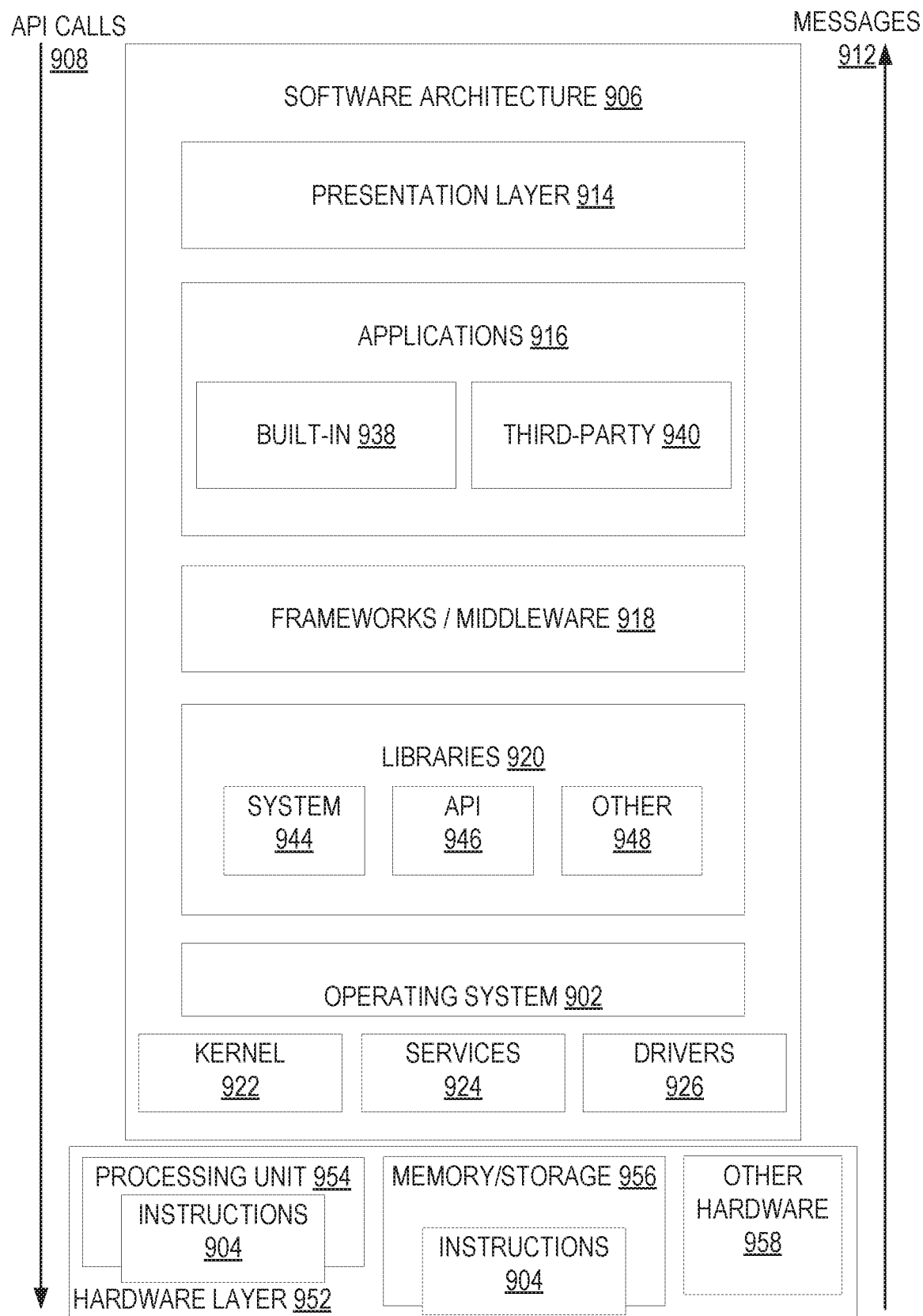
FIG. 9 is a block diagram illustrating a representative software architecture, which may be used in conjunction with various hardware architectures herein described, according to example embodiments.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory 1014, and input/output (I/O) components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic UI (GUI) functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built-in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
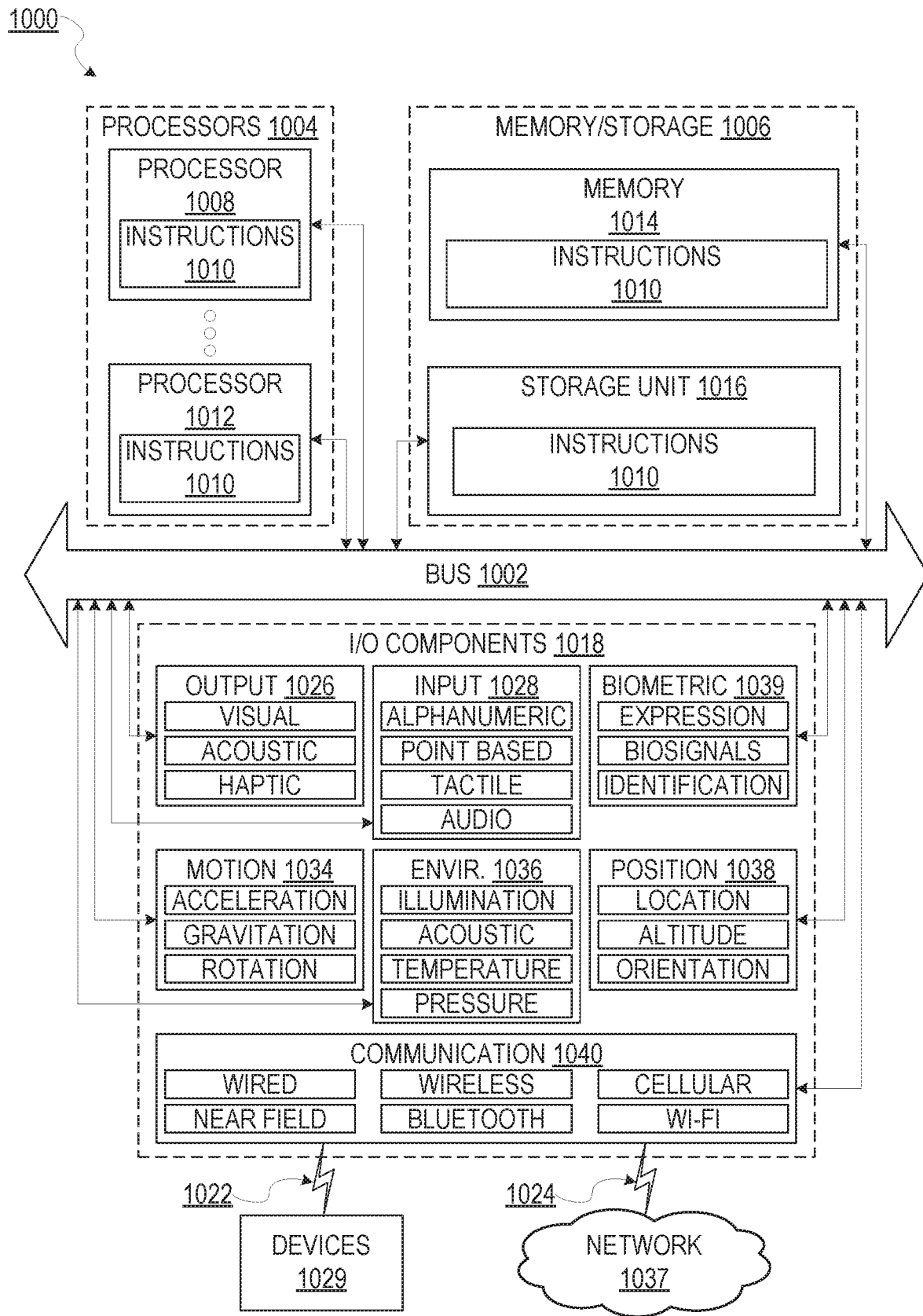
FIG. 10 is a block diagram illustrating components of a machine able to read instructions from a machine-readable medium (e.g., a machine-readable storage medium) and perform any one or more of the methodologies discussed herein, according to example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. In an example embodiment, the processors 1004 (e.g., a central processing unit (CPU), a reduced instruction set computing (RISC) processor, a complex instruction set computing (CISC) processor, a graphics processing unit (GPU), a digital signal processor (DSP), an application-specific; integrated circuit (ASIC), a radio-frequency integrated circuit (RFIC), another processor, or any suitable combination thereof) may include, for example, a processor 1008 and a processor 1012 that may execute the instructions 1010. The term "processor" is intended to include multi-core processors 1004 that may comprise two or more independent processors (sometimes referred to as "cores") that may execute instructions contemporaneously. Although FIG. 10 shows multiple processors 1004, the machine 1000 may include a single processor with a single core, a single processor with multiple cores (e.g., a multi-core processor), multiple processors with a single core, multiple processors with multiple cores, or any combination thereof.

The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1039, motion components 1034, environmental components 1036, or position components 1038 among a wide array of other components. For example, the biometric components 1039 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1037 or devices 1029 via coupling 1024 and coupling 1022, respectively. For example, the communication components 1040 may include a network interface component or other suitable device to interface with the network 1037. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1029 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit physical circuit emulated by logic executing on an actual processor) that manipulates data values according to control signals (e.g., "commands," "op codes," "machine code,", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
   determining, by one or more processors, a current location of a plurality of user devices associated with a plurality of users;
   determining, by the one or more processors, that a same weather condition at the current location is associated with the plurality of user devices;
   in response to determining that the same weather condition at the current location is associated with the plurality of user devices, selecting first and second visual attributes corresponding to the same weather condition, wherein the first visual attribute differs from the second visual attribute;
   automatically generating, by the one or more processors, a plurality of weather-based avatars for the users associated with the user devices, a first weather-based avatar of the plurality of weather-based avatars having the first visual attribute and a second weather-based avatar of the plurality of weather-based avatars having the second visual attribute, the automatic generation of the first weather-based avatar comprising:
      retrieving an image that displays a vehicle in a first state associated with a first weather condition;
      adjusting an attribute of the image to display the vehicle in a second state associated a second weather condition corresponding to the same weather condition; and
      placing the first weather-based avatar inside of the displayed vehicle in the second state to combine the first weather-based avatar with the displayed vehicle in the second state; and
   in response to a request from a requesting device, causing, by the one or more processors, concurrent display on the requesting device of the plurality of weather-based avatars comprising the first and second weather-based avatars.

2. The method of claim 1, wherein the request is a request for weather information, wherein the determining and the generating of the weather-based avatars are performed responsive to the request for weather information, and wherein the method further comprising:
   modifying an existing avatar based on the weather condition to generate the first weather-based avatar; and
   generating for display on the requesting device the first weather-based avatar together with a visual representation of the weather condition.

3. The method of claim 1 further comprising:
   retrieving a background corresponding to the weather condition; and
   generating for display the first weather-based avatar with the first visual attribute together with the background.

4. The method of claim 1, wherein selecting first and second visual attributes comprises:
   selecting the first visual attribute from a sequential list of weather-based avatar visual attributes; and
   selecting the second visual attribute from the sequential list of weather-based avatar visual attributes, wherein the second visual attribute sequentially follows the first visual attribute in the sequential list.

5. The method of claim 1, wherein the first and second visual attributes are randomly selected, further comprising:
   storing a plurality of visual attributes of the first weather-based avatar associated with the weather condition.

6. The method of claim 1, wherein the weather condition includes a weather forecast for a plurality of days, wherein the weather-based avatar is displayed together with a visual representation of the weather condition, and wherein the visual representation of the weather condition comprises, for each day in the forecast, a temperature indicator, a day indicator, or a graphic and textual description of the weather condition.

7. The method of claim 1, wherein the current location is a first location, further comprising:
   displaying the plurality of weather-based avatars comprising the first and second weather-based avatars on a first page of a plurality of pages together with a visual representation of the same weather condition;
   receiving first input comprising a first swipe gesture along a first direction on the first page; and
   in response to receiving the first input comprising the first swipe gesture, displaying a transition from the first page to a second page, the second page comprising a third weather-based avatar with a visual attribute corresponding to a second weather condition at a second location of a second user together with a given visual representation of the second weather condition, wherein displaying the transition comprising displaying a first portion of the first page together with a second portion of the second page.

8. The method of claim 7, wherein the first page comprises an indicator with a number of dots representing how many more pages of weather information are available, further comprising:
   updating the indicator to identify the second user associated with the second page based on the transition;
   receiving second input comprising a second swipe gesture along a second direction on the first page different from the first direction; and
   in response to receiving the second input comprising the second swipe gesture, providing additional weather details about the first location corresponding to the first page.

9. The method of claim 1 further comprising:
   determining, based on a current context, that the first user device is in the vehicle;
   determining that the first weather condition corresponds to sunny, wherein the displayed vehicle in the first state comprises display of a boat in calm water conditions; and
   determining that the second weather condition corresponds to rainy, wherein adjusting the attribute to display the vehicle in the second state comprises displaying the boat with rough water conditions.

10. The method of claim 1 further comprising:
    determining, based on a current context, that the first user device is in the vehicle;
    determining that the first weather condition corresponds to sunny, wherein the displayed vehicle in the first state comprises display of a car with a roof open; and determining that the second weather condition corresponds to rainy, wherein adjusting the attribute to display the vehicle in the second state comprises displaying the car with the roof closed and animating windshield wipers of the car.

11. The method of claim 1, wherein the weather condition is a first weather condition, and wherein the first weather-based avatar with the first visual attribute is displayed together with a visual representation of the weather condition as a first page of a plurality of pages on the user device, and wherein the method further comprising:
receiving, from the requesting device, a request to access a second page of the plurality of pages;
identifying a second user associated with the second page; and
generating for display, in the second page, a third weather-based avatar with a visual attribute corresponding to a second weather condition at a first location of the second user together with a given visual representation of the second weather condition.

12. The method of claim 11 further comprising receiving, from the requesting device, a user selection of a set of users for which to provide weather information, wherein the second user is identified based on the set of users, wherein the plurality of pages is arranged based on groups of the set of users.

13. The method of claim 12 further comprising:
determining that users in a first group of the set of users are within a specified range of the first location;
determining that users in a second group of the set of users are within a specified range of a second location;
associating the first group of users with the second page such that a plurality of avatars associated with the first group of users is included in the second page together with the second avatar; and
associating the second group of users with a third page of the plurality of pages.

14. The method of claim 12 further comprising:
accessing current weather conditions at a plurality of locations associated with the set of users;
retrieving historical weather information at the plurality of locations;
comparing the current weather conditions with the historical weather information;
determining that a given weather condition at a given location of the plurality of locations associated with a third user is different from the historical weather information at the given location by more than a specified amount; and
modifying an arrangement of the plurality of pages in response to determining that the given weather condition is different from the historical weather information at the given location by more than the specified amount.

15. The method of claim 14, wherein modifying the arrangement comprises advancing one of the plurality of pages to an earlier position in a sequence corresponding to the plurality of pages in response to determining that the given weather condition is different from the historical weather information at the given location by more than the specified amount.

16. The method of claim 14 further comprising determining whether a user of the requesting device is interested in receiving weather information for the given location of the third user, wherein modifying the arrangement is performed in response to determining that the user is interested in receiving weather information for the given location of the third user.

17. The method of claim 14 further comprising generating for display, on the requesting device, an option for a user of the requesting device to compose and send a message to the third user in response to determining that the given weather condition is different from the historical weather information at the given location by more than the specified amount.

18. A system comprising:
a processor configured to perform operations comprising:
determining a current location of a plurality of user devices associated with a plurality of users;
determining that a same weather condition at the current location is associated with the plurality of user devices;
in response to determining that the same weather condition at the current location is associated with the plurality of user devices, selecting first and second visual attributes corresponding to the same weather condition, wherein the first visual attribute differs from the second visual attribute;
automatically generating a plurality of weather-based avatars for the users associated with the user devices, a first weather-based avatar of the plurality of weather-based avatars having the first visual attribute and a second weather-based avatar of the plurality of weather-based avatars having the second visual attribute, the automatic generation of the first weather-based avatar comprising:
retrieving an image that displays a vehicle in a first state associated with a first weather condition;
adjusting an attribute of the image to display the vehicle in a second state associated a second weather condition corresponding to the same weather condition; and
placing the first weather-based avatar inside of the displayed vehicle in the second state to combine the first weather-based avatar with the displayed vehicle in the second state; and
in response to a request from a requesting device, causing concurrent display on the requesting device of the plurality of weather-based avatars comprising the first and second weather-based avatars.

19. The system of claim 18, wherein the operations further comprise:
retrieving a background corresponding to the weather condition; and
generating for display the first weather-based avatar with the first visual attribute together with the background.

20. A non-transitory machine-readable storage medium that includes instructions that, when executed by one or more processors of a machine, cause the machine to perform operations comprising:
determining a current location of a plurality of user devices associated with a plurality of users;
determining that a same weather condition at the current location is associated with the plurality of user devices;
in response to determining that the same weather condition at the current location is associated with the plurality of user devices, selecting first and second visual attributes corresponding to the same weather condition, wherein the first visual attribute differs from the second visual attribute;
automatically generating a plurality of weather-based avatars for the users associated with the user devices, a first weather-based avatar of the plurality of weather-based avatars having the first visual attribute and a second weather-based avatar of the plurality of weather-based avatars having the second visual attribute, the automatic generation of the first weather-based avatar comprising:
retrieving an image that displays a vehicle in a first state associated with a first weather condition;
adjusting an attribute of the image to display the vehicle in a second state associated a second weather condition corresponding to the same weather condition; and
placing the first weather-based avatar inside of the displayed vehicle in the second state to combine the first weather-based avatar with the displayed vehicle in the second state; and
in response to a request from a requesting device, causing concurrent display on the requesting device of the plurality of weather-based avatars comprising the first and second weather-based avatars having respectively the first and second visual attributes.

\* \* \* \* \*